US006868505B2

(12) United States Patent
Ma et al.

(10) Patent No.: US 6,868,505 B2
(45) Date of Patent: Mar. 15, 2005

(54) MEMORY EXCHANGE

(75) Inventors: Edward Tang Kwai Ma, Plano, TX (US); Stephen N. Grider, Argyle, TX (US); Frank V. Taylor, III, Highland Village, TX (US); Joseph P. Gorski, Plano, TX (US); Andrew D. Jones, Richardson, TX (US); Wendell L. Little, deceased, late of Denton, TX (US); by Ann Little, legal representative, Corinth, TX (US)

(73) Assignee: Dallas Semiconductor Corporation, Dallas, TX (US)

( * ) Notice: Subject to any disclaimer, the term of this patent is extended or adjusted under 35 U.S.C. 154(b) by 580 days.

(21) Appl. No.: 09/924,239

(22) Filed: Aug. 7, 2001

(65) Prior Publication Data

US 2002/0194521 A1 Dec. 19, 2002

Related U.S. Application Data

(60) Provisional application No. 60/223,176, filed on Aug. 7, 2000, and provisional application No. 60/223,668, filed on Aug. 7, 2000.

(51) Int. Cl.$^7$ .............................................. G08F 11/00
(52) U.S. Cl. ........................................ 714/1; 711/133
(58) Field of Search .............................. 714/1, 3, 5, 6, 714/31, 42; 711/133, 134, 159

(56) References Cited

U.S. PATENT DOCUMENTS

| | | | | | |
|---|---|---|---|---|---|
| 4,751,636 | A | * | 6/1988 | Sibley | 711/166 |
| 5,542,042 | A | * | 7/1996 | Manson | 714/2 |
| 5,636,153 | A | * | 6/1997 | Ikegaya et al. | 708/490 |
| 6,347,368 | B1 | * | 2/2002 | Harthcock | 712/227 |

* cited by examiner

Primary Examiner—Nadeem Iqbal
(74) Attorney, Agent, or Firm—Jenkens & Gilchrist

(57) ABSTRACT

Methods, systems, and arrangements enable efficient reprogramming of a memory block of a microcontroller. Two blocks of memory each have a different logical location with respect to a processor of the microcontroller. The first memory may store vector information to be executed by the processor. The second memory may store data information. The logical location of each memory block is dependent on the value of a pre-determined bit in a specified register. When a user wishes to reprogram the contents of the first memory, the user enters new code into the second memory. Upon completion, the value of the pre-determined bit is changed, and the logical locations of the first and second memories are interchanged. In effect, the newly entered code from the second memory is accessed as if it were in the first memory (e.g., from an addressing perspective), and the processor may execute the new program (e.g., after the processor undergoes a system reset).

28 Claims, 6 Drawing Sheets

MEMORY EXCHANGE

CROSS-REFERENCES TO RELATED APPLICATIONS

This Nonprovisional Application for Patent claims the benefit of priority from, and hereby incorporates by reference the entire disclosure of, co-pending U.S. Provisional Application for Patent Ser. No. 60/223,176, filed on Aug. 7, 2000, and co-pending U.S. Provisional Application for Patent Ser. No. 60/223,668, also filed on Aug. 7, 2000.

BACKGROUND OF THE INVENTION

1. Technical Field of the Invention

The present invention relates in general to memory, and more particularly, by way of example but not limitation, (i) to data protection when reprogramming a memory of a microcontroller and/or (ii) to enabling in-system reprogramming of a memory of a microcontroller.

2. Description of Related Art

Electronic devices are a vital force for creating and perpetuating the engine that drives today's modern economy; concomitantly, electronic devices improve the standard of living of people in our society. Furthermore, they also play an important role in providing entertainment and other enjoyable diversions. A central component of many of these electronic devices are processing units. Processing units may be broadly divided into two categories: (i) processors used as central processing units (CPUs) of (e.g., personal) computers and (ii) embedded processors (a.k.a. microcontrollers, microprocessors, etc.) (e.g., processors operating in cars, microwaves, wireless phones, industrial equipment, televisions, other consumer electronic devices, etc.). Although CPUs of computers garner the lion's share of reports and stories presented by the popular press, they are only responsible for less than 1% of all processors sold while microntrollers are actually responsible for greater than 99% of all processors sold. Consequently, significant time and money is also expended for research and development to improve the efficiency, speed, security, feature set, etc. of microcontrollers. These aspects of microcontrollers may be improved, individually or in combination, by improving one or more of the individual aspects of which microcontrollers are composed. Exemplary relevant aspects of microcontrollers include, but are not limited to: processing core, memory, input/output (I/O) capabilities, security provisions, clocks/timers, program flow flexibility, programability, etc.

With regard to memory, Random Access Memory (RAM) is known in the art as the kind of memory that is typically used for holding data and programs that are being executed. RAMs are employed in applications in which a user desires to both read from and write to memory. Thus, RAM differs from Read-Only Memory (ROM), which can only be read from. Furthermore, unlike ROM, RAM is termed volatile storage because the contents of RAM are lost when power is no longer supplied thereto. This volatility characteristic of RAM therefore requires a prudent user to frequently save data to prevent the loss of any work that may be in progress, if/when power is lost.

Static RAM (SRAM) is a specific type of RAM that holds its data without external refresh, for as long as power is supplied to the SRAM circuit. This is in contrast with dynamic RAM (DRAM), which must be refreshed many times per second in order to retain its memory contents. Although SRAM is superior to DRAM in terms of speed of access as well as freedom from refresh requirements, using SRAM technology does not avoid one disadvantage in that the user must maintain a power supply to the SRAM memory in order for the volatile SRAM to preserve stored information. Therefore, under those unexpected circumstances in which the system experiences power loss or power failure, the user has little choice but to reprogram those lost contents of SRAM memory.

Alternatively, to better ensure preservation of memory contents, the user may load the configuration data from a permanently programmed memory (typically a programmable ROM (PROM)) each time the system is turned on. This method, however, does not provide the user with the option of reprogramming the contents of the permanently programmed memory, or altering the instructions of the program. It therefore limits the programming options of the user and offers only a means of retrieving and executing a pre-programmed set of code.

Another problem facing conventional memory configurations is that a partially reprogrammed memory presents the potential for partial or complete information loss. Unforeseen circumstances such as, by way of example only, power loss, can result in the loss of information in a partially (re-)programmed RAM. Hence, many RAM applications dictate that the user reprogram the entire available block of RAM. Traditional RAM systems provide only a single block of RAM. Thus, the user must delete and reprogram each cell of the entire single memory block. While performing the reprogramming, an incident such as the aforementioned power failure can result in the complete loss of both the reprogrammed portion of the memory as well as the originally-programmed contents of the memory. The user, once again, has no choice but to manually reenter the code, resulting in the expenditure of additional time and corresponding and other consequential loss of productivity. Therefore, conventional systems fail to provide a safeguard against unexpected loss of data or code.

SUMMARY OF THE INVENTION

The deficiencies of the prior art are overcome by the methods, systems, and arrangements of the present invention. For example, as heretofore unrecognized, it would be beneficial to provide a safeguard against unexpected loss of data and/or code during memory reprogramming. In fact, it would be beneficial if protected reprogramming of a memory were provided such that original data and/or code may be utilized if/when a power loss incident occurs during memory reprogramming.

The present invention is directed to methods, systems, and arrangements for effectively reprogramming a block of memory. In certain embodiment(s), the present invention involves two blocks of programmable memory: a memory "A" (e.g., for storing vector instructions to be utilized by the system) and a memory "B" (e.g., for storing data information). The logical locations of these two memories may be interchanged by the user for reprogramming, for example. When a user wishes to reprogram or alter the vector contents of the programmable memory, new program code instructions may be entered into the memory "B". Upon completion of code entry, the logical locations of the two memories may be exchanged. For example, a change in a pre-determined bit in a register may actuate a reset that interchanges the logical locations of the two memories. Thus, the contents of the logical memory "A" may equate to a new set of recently-programmed vector instructions while the logical memory "B" therefore contains the previous contents of the memory "A", which may now be considered as data information. Consequently, with the availability of a "backup" memory, the contents in vector RAM are not lost even if the system should undergo power loss during, for example, reprogramming.

BRIEF DESCRIPTION OF THE DRAWINGS

A more complete understanding of the methods, systems, and arrangements of the present invention may be had by reference to the following detailed description when taken in conjunction with the accompanying drawings, wherein.

DETAILED DESCRIPTION

The numerous innovative features of the present application will be described with particular reference to the presently preferred exemplary embodiments. However, it should be understood that this class of embodiments provides only a few examples of the many advantageous uses of the innovative teachings herein. In general, statements made in the specification of the present invention do not necessarily delimit any of the various aspects of the claimed invention. Moreover, some statements may apply to some inventive features, but not to others.

Figure 1:
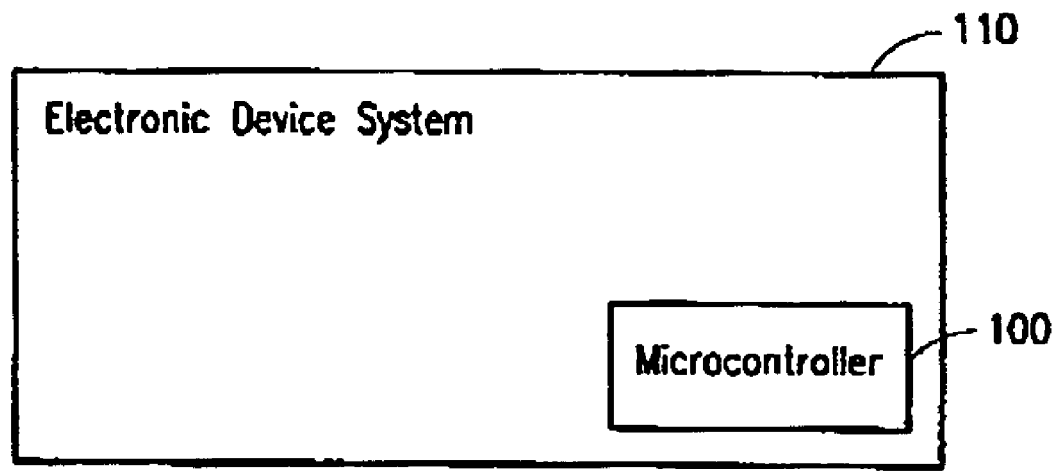
FIG. 1 illustrates an exemplary environment and embodiment in accordance with the present invention.

Reference is now made to FIG. 1, wherein there is shown an exemplary environment and embodiment in accordance with the present invention. An electronic device system 110 is illustrated as including a microcontroller 100. The microcontroller 100 may control (e.g., perform processing operations for, command actions to be undertaken by, etc.) the entire electronic device system 110, a portion of the electronic device system 110, etc. The microcontroller 100 has application in a variety of systems and/or fields. These systems and/or fields may especially include environments in which high performance and/or low power are important. The systems and/or fields (and hence the nature of the electronic device system 110) in which the microcontroller 100 may be employed include, but are not limited to: telecommunications, industrial controls, hand-held/portable devices, system supervision, data logging, motor control, etc. The electronic device system 110 may itself correspond to, for example: data switchers and/or routers; subscriber line interface cards; modems; digitally-controlled machining tools such as mills, lathes, and drills; portable radios; cellular telephones; voltmeters, ammeters, and ohmmeters; Personal Digital Assistants (PDAs); televisions; cable TV set top boxes; camcorders; stereo equipment; audio compact disk (CD) players; etc.

Figure 2:
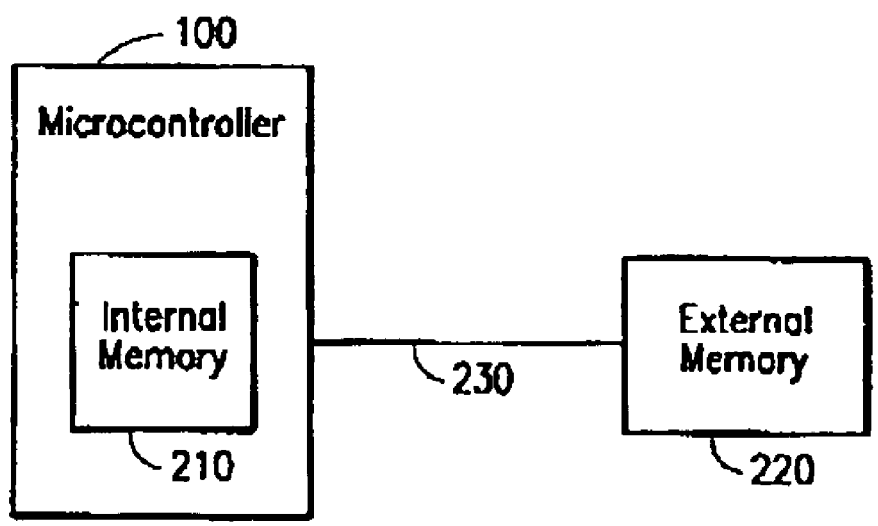
FIG. 2 illustrates exemplary internal and external memories of a microcontroller in accordance with the present invention.

Reference is now made to FIG. 2, wherein is illustrated exemplary internal and external memories of a microcontroller in accordance with the present invention. The memory of a microcontroller 100 is configured into two distinct memories, namely an internal (on-chip) memory 210 contained within logical locations internal to the microcontroller 100 and an external memory 220 contained off-chip, outside of the microcontroller, wherein the external memory is coupled to the microcontroller by means of a bus interface 230.

Figure 3:
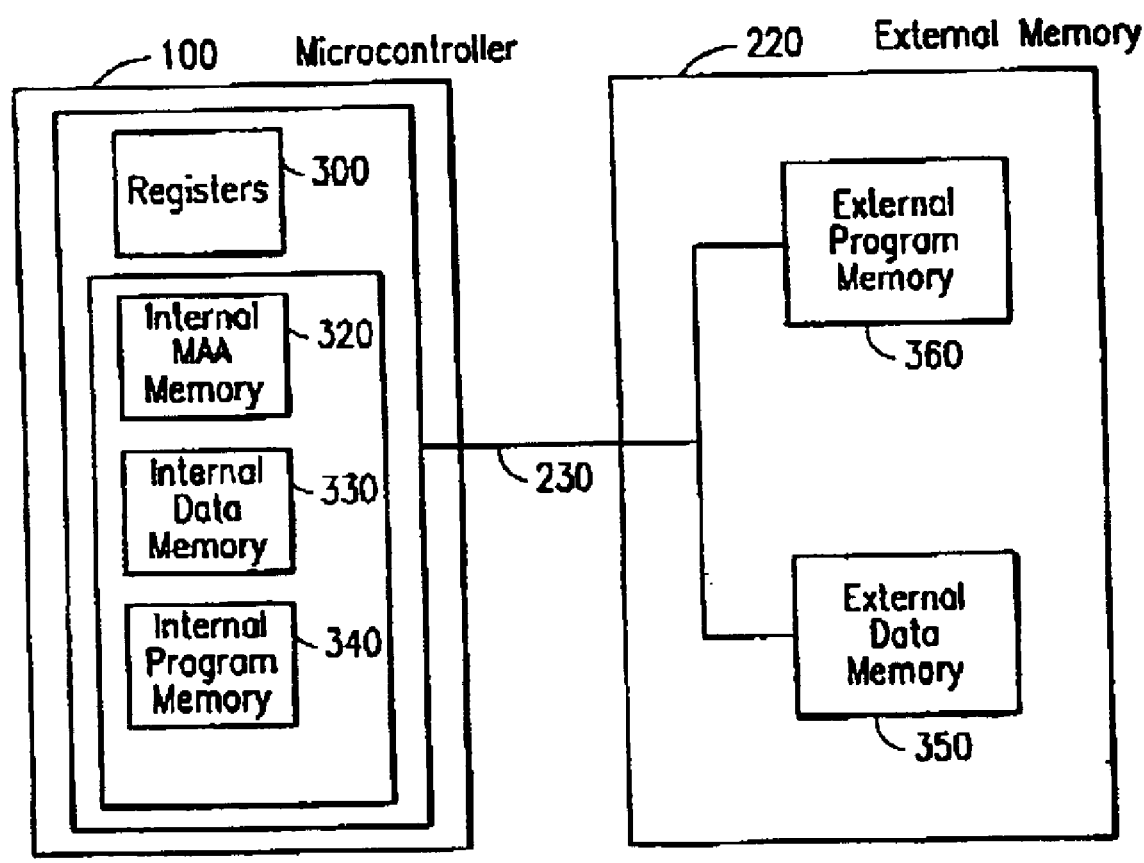
FIG. 3 illustrates a more-detailed diagram of the exemplary internal and external memories of the microcontroller of FIG. 2 in accordance with the present invention.

With reference now to FIG. 3, there is illustrated a more-detailed diagram of the exemplary internal and external memories of the microcontroller of FIG. 2 in accordance with the present invention. An internal (on-chip) memory 210 area is employed within the logical locations of a microcontroller 100. The internal memory 210 comprises registers 300, internal Modular Arithmetic Accelerator (MAA) memory 320, internal data memory 330, and internal program memory 340, to support security and high speed operations. The latter three components form the internal SRAM memory 310. Moreover, the external memory 220 is composed of an external program memory 360 and an external data memory 350. The internal and external memories are coupled to each other via a bus interface 230. The registers are located on-chip in the internal memory 210 space, but the program and data memories can be either on-chip, off-chip, or a combination of the two. A preferred embodiment of the present invention may utilize a memory addressing scheme that separates program memory from data memory. However, the program and data segments may alternatively be overlapped since they may be accessed in different ways.

Figure 4:
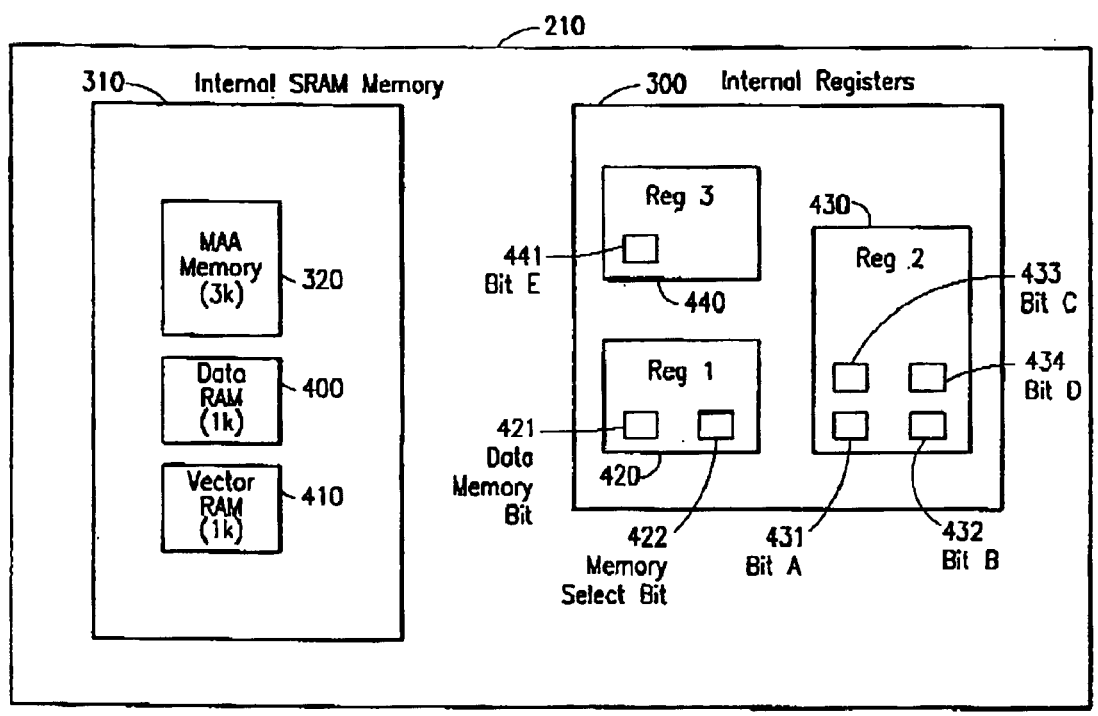
FIG. 4 illustrates a more-detailed diagram of the internal memory of FIG. 3 in accordance with the present invention.

Reference is now made to FIG. 4, wherein is illustrated a more-detailed diagram of the internal memory of FIG. 3 in accordance with the present invention. The internal memory 210 is composed of internal registers 300 and internal Static RAM (SRAM) memory 310. The internal SRAM memory 310 (which is shown as an exemplary 5K byte memory embodiment) is further divided into three exemplary memory areas: the MAA memory 320, data RAM 400, and vector RAM 410. Data RAM 400 and vector RAM 410 are both battery backed, with data RAM 400 corresponding to the internal data memory 330 and vector RAM 410 corresponding to the internal program memory 340. However, it should be understood that the principles of the present invention are not so limited and that they are applicable to other types of memories and other memory configurations as known in the art.

The memory function of the internal SRAM memory 310 is user selectable with the exception of the lowest 1K of program memory, which is denoted as Vector RAM 410. The Vector RAM 410 may be considered as the lowest addressable 1K of the SRAM program memory space to store reset and interrupt vectors for security enhancement. In the default mode, the lowest 1K SRAM is referred to as the RAM0 location.

The second 1K SRAM (RAM1) is defaulted to data memory space 400 (also denoted as data RAM), but can be configured to program or program/data memory space, if the logical value of a corresponding data memory bit 421 in a Register 1 420 is cleared to a logic 0. Setting the data memory bit 421 to a logic 1 enables the extended stack mode, and the system stack operates in the RAM1 area. Furthermore, a third setting of select bits, namely Bit A 431 and Bit B 432 in Register 2 430, reserves RAM1 to be used as a stack memory exclusively and pushes this data memory space to an external data memory. In certain embodiments, using the RAM1 area for any memory function other than data memory or stack is prohibited while the data memory bit 421 is set to a logic 1. When a Bit A 431 in Register 2 430 is set to a logic 1, RAM1 is defined as program memory or program/data memory space, and writing a 1 to the data memory bit 421 will result in no change to the Register 1 420.

As illustrated in FIG. 4, the remaining 3K of SRAM (RAM2) 320 is defaulted to MAA data memory space. However, this memory area may be directed to program, MAA data, or program/data memory space as well. RAM2 can be defined as program memory or program/data memory space if, for example, the setting of a Bit E 441 in a Register 3 440 is cleared to a logic 0. Setting the Bit B 432 to a logic 1 will enable the MAA operation on RAM2 for all MAA data accessing. Setting the select bits, Bit C 433 and Bit D 434 in Register 2 430, to "01" reserves RAM2 to be used as MAA data only and pushes this data memory space into an external data memory. In certain embodiments, using the RAM2 area for memory functions other than data memory or MAA data is prohibited while Bit E 441 is set to a logic 1. When a Bit C 433 in Register 2 430 is set to logic 1, RAM2 is defined as program memory or program/data memory space, and writing a 1 to Bit E 441 results in no change to Register 3 440. As illustrated in Table 1, the memory functions for RAM1 and RAM2 may be specified by the select bits in Register 2 430. It is to be understood that the bit assignments listed and/or described above and/or below are given by way of example, and do not limit the scope of the invention, for other bit, register, bit-register combinations, bit values, etc. may alternatively be employed.

TABLE 1

| Bit A | Bit B | RAM1 MEMORY FUNCTION |
|---|---|---|
| 0 | 0 | Data memory (or stack if SA = 1); default) |
| 0 | 1 | Stack (SA = 1) |
| 1 | 0 | Program Memory |
| 1 | 1 | Program/Data Memory |

| Bit C | Bit D | RAM2 MEMORY FUNCTION |
|---|---|---|
| 0 | 0 | Data memory |
| 0 | 1 | MAA data (default) |
| 1 | 0 | Program memory |
| 1 | 1 | Program/Data Memory |

Finally, FIG. 4 depicts an additional bit, memory select bit 422 in Register 1 420. The memory select bit 422 is battery-backed and controls the logical locations of vector RAM 410 and data RAM 400. Vector RAM 410 contains executable program code, whereas data RAM 400 stores data that is not intended to be executed by the processor. When a user wishes to reprogram or alter the contents of vector RAM 410, the user enters the preferred code into data RAM 400. Upon completion of entry into data RAM 400, a change in the memory select bit 422 actuates a system reset and interchanges the logical locations of vector RAM 410 and data RAM 400. To prevent disturbance of any program that may have concurrently been executed, the interchange of vector RAM 410 and data RAM 400 takes place after activation of the system reset. Thus, the contents of vector RAM 410 remain in the lowest 1K of program memory in terms of physical location, but its logical addressibility is interchanged with that of data RAM 400. For example, if vector RAM 410 (the lowest 1K of SRAM memory) was originally associated with the RAM0 location, and data RAM 400 was originally associated with the RAM1 location, a change in the memory select bit 422 resets the system and interchanges the logical locations of vector RAM 410 and data RAM 400, such that vector RAM instead becomes associated with the RAM1 location, and data RAM with the RAM0 location. (It should be noted that in alternative embodiment(s) the system need not be automatically reset when the memory select bit 422 is changed.) This allows one to alter the contents of vector RAM 410, through the data RAM 400, without losing the original vector information in the event of power failure, e.g., during reprogramming.

Figure 5:
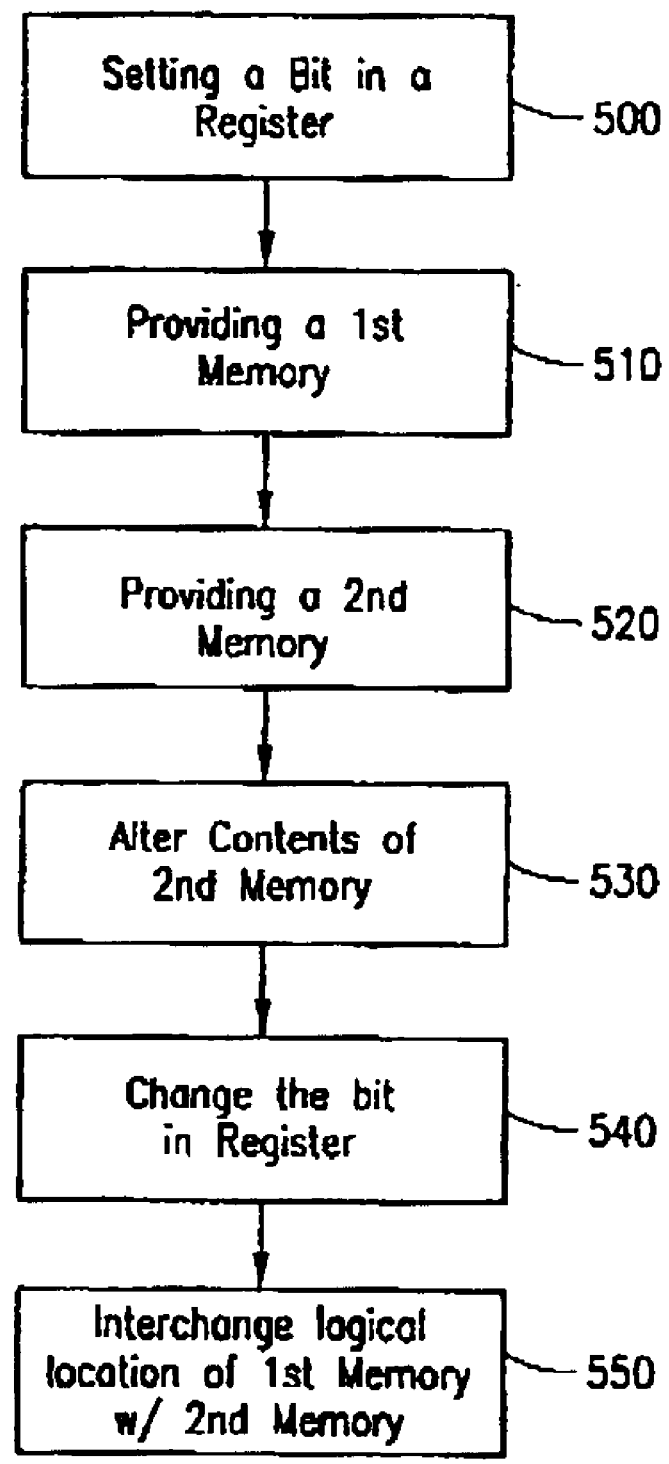
FIG. 5 illustrates an exemplary method in flowchart form for reprogramming a memory of a microcontroller in accordance with the present invention.

Referring now to FIG. 5, there is illustrated an exemplary method in flowchart form for reprogramming a memory of a microcontroller in accordance with the present invention. Certain embodiment(s) of the present invention allow the user to interchange the logical locations of RAM0 with RAM1, thereby changing the logical locations of vector RAM and data RAM, for example. Within the microcontroller, in step 500, a pre-determined bit (e.g., memory select bit 422) is set (e.g., in Register 1 420). The logical value of this pre-determined bit determines the physical location of a logical memory (or, conversely, the logical addressibility of a physical memory location). Although certain embodiment(s) specify the memory as vector RAM, the scope of the present invention is not to be limited to any specific type of memory or contents thereof. Then, as illustrated in steps 510 and 520, respectively, a first and second memory are established. Upon determining the logical locations of the two memories, the user alters the contents of the second memory, as illustrated in step 530. Upon conclusion of this step, the value of the pre-determined bit is changed in the register, as denoted in step 540. Responsive to this change, in a step 550, the logical location of the first memory is interchanged with the logical location of the second memory. In certain embodiments of the present invention, a change in the pre-determined bit in the register actuates a system reset, such that after the logical locations of the two memories are interchanged, the system begins execution of program code using the new contents of the "first" memory.

The logical locations of two memories may be interchanged using a number of techniques. For example, if a first memory is assigned address locations 0 to M and the second memory is assigned address locations (M+1) to N, the logical locations of each may be interchanged by assigning address locations 0 to M to the second memory and address locations (M+1) to N to the first memory. The predetermined bit may indicate which addressing scheme is in effect. Alternatively, the assigned address locations for each memory may remain unchanged, but the predetermined bit may indicate whether or not a provided address for one memory is transformed and/or converted to the address space of the other memory (e.g., "M" may be added to any address between 0 and M while "M" is subtracted from any address between (M+1) and N). It should be noted that other alternatives are possible and are within the course and scope of the present invention.

Figure 6:
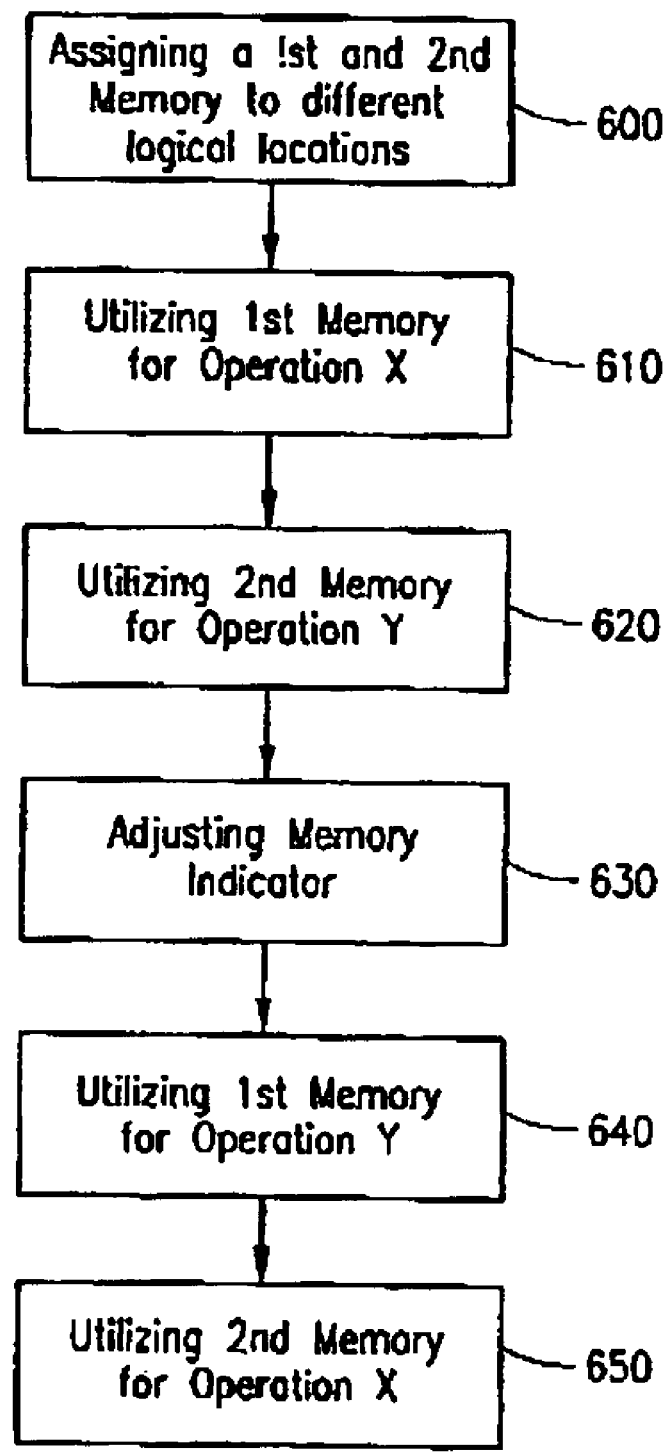
FIG. 6 illustrates another exemplary method in flowchart form for reprogramming a memory of a microcontroller in accordance with the present invention.

Reference is now made to FIG. 6, wherein is illustrated another exemplary method in flowchart form for reprogramming a memory of a microcontroller in accordance with the present invention. In step 600, a first and second memory are assigned to different pre-determined logical locations. The first memory is accessed/utilized for an operation X, while the second memory is accessed/utilized for an operation Y, as illustrated in steps 610 and 620, respectively. In step 630, an adjustment is made to a memory indicator. Responsive to this adjustment, as indicated in steps 640 and 650 respectively, the first memory is accessed/utilized for operation Y while the second memory is accessed/utilized for operation X. Operation X may correspond to, for example, a data retrieval or storage while operation Y may correspond to, for example, a code retrieval or storage. Other information/operation types are alternatively possible.

Figure 7:
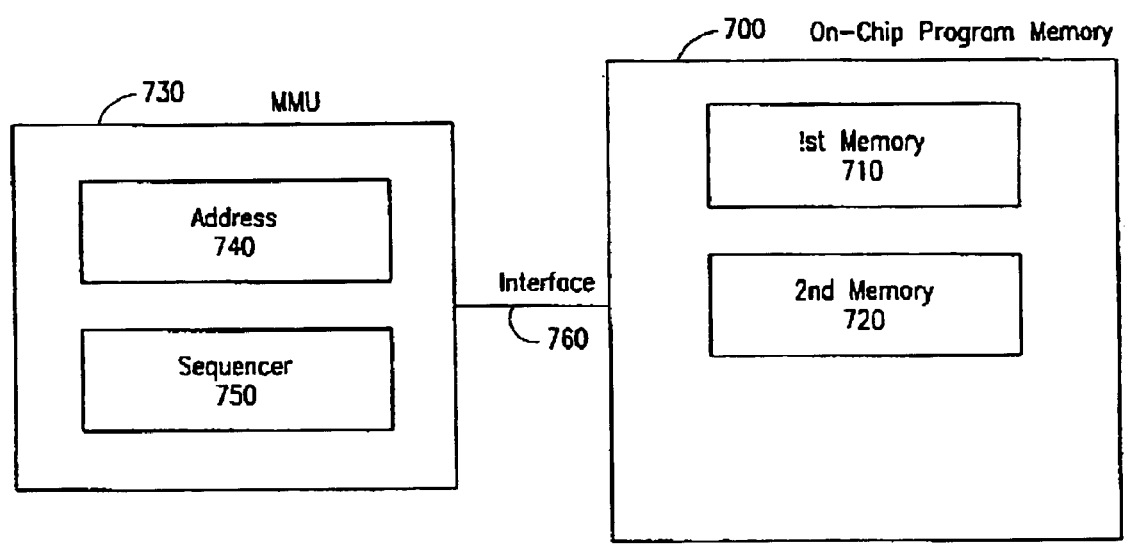
FIG. 7 illustrates an exemplary on-chip program memory map for an alternative embodiment in accordance with the present invention.

Reference is now made to FIG. 7, wherein is illustrated an on-chip program memory map for an alternative embodiment in accordance with the present invention. In this alternative embodiment, on-chip program memory 700 is logically divided into a first memory 710 and a second memory 720, both composed of a Flash memory to support in-system programming. Although this alternative embodiment utilizes Flash memory programming, the scope of the invention is not to be limited to Flash memories, for it may incorporate, for example, any programmable memory type known in the art. The on-chip program memory 700 is coupled to a Memory Management Unit (MMU) 730 via an interface 760. The MMU 730 includes an address 740 and a sequencer 750. The on-chip program memory 700 is designed to be programmed in-system with a standard 5 volt Vcc supply under the control of user software or by using a built-in program memory loader. It may also be programmed in standard Flash or Erasable Programmable Read Only Memory (EPROM) programmers. In this alternative embodiment, the MMU 730 is incorporated to control program and data memory access, and it provides sequencing and timing controls for programming of the on-chip memory. In-system programming of on-chip Flash memory by user software is initiated by writing a command into a specified register to enable the Flash memory for erase, program, and verify operations. Address and data are input into the MMU via a data register (not explicitly shown in FIG. 7). The MMU's sequencer provides the operation sequences and control functions to the Flash memory.

It may be that only the first memory 710 of the two on-chip program memories (710 and 720) can be in-system programmed by the user software. This is due to the possibility that the second on-chip program memory 720 may contain system-hardware-dependent codes that are crucial to system operation and should therefore not be altered during in-application programming. Therefore, to update the second memory 720, the user first provides updated new codes in the first memory 710 bank. Once the new codes are updated and verified, the user software complements the logic state of a corresponding memory bit, thereby forcing a reset. The corresponding memory bit may be, for example, a nonvolatile memory cell which can be set or reset by the MMU, where its logic state determines which physical memory bank is to be used as the logical second memory 720 bank. A reset may automatically configure the memory banks in an addressing order defined by the logic state of the corresponding memory bit. The System Reset command, for example, can be used by the software to force a system reset after changing the corresponding memory bit. A reset effectively replaces the original codes with the newly updated codes by logically switching the memory banks. The original first memory 710 bank becomes the second memory 720 bank, and it then includes the newly programmed system-hardware-dependent codes that are crucial to system operation. The original second memory 720 bank therefore becomes the first memory 710 bank, and it can be erased and reprogrammed as needed.

Although the present invention is open to various modifications and alternative constructions, a preferred exemplary embodiment that is shown in the drawings is described herein above in detail. It is to be understood, however, that there is no intention to limit the invention to the particular forms and/or step sequences disclosed. One skilled in the art can recognize that there are numerous modifications, equivalences and alternative constructions that fall within the spirit and scope of the invention as expressed in the claims.

What is claimed is:

1. A method for reprogramming a memory in a microcontroller, comprising the steps of:

providing a first memory, said first memory storing program instructions that the microcontroller is capable of executing;

providing a second memory, said second memory storing information;

identifying a pre-determined bit in a register, wherein a logical value of said pre-determined bit determines a first logical location of said first memory and a second logical location of said second memory;

altering said information of said second memory to produce altered information;

changing said logical value of said pre-determined bit in said register; and responsive to said step of changing, interchanging said first logical location of said first memory with said second logical location of said second memory.

2. The method according to claim 1, wherein the reprogramming comprises:

in-system reprogramming.

3. The method according to claim 1, wherein said step of changing actuates a system reset.

4. The method according to claim 1, wherein said first and second memories comprise:

Random Access Memories.

5. The method according to claim 1, wherein said step of altering said information comprises the step of:

storing instructions to said second memory to produce said altered information.

6. The method according to claim 1, wherein said program instructions comprise:

vector instructions.

7. The method according to claim 1, further comprising the step of:

responsive to said step of interchanging, executing said altered information of said second memory from said first logical location.

8. The method according to claim 1, wherein said step of identifying a pre-determined bit comprises the step of:

identifying a battery-backed pre-determined bit.

9. The method according to claim 1, wherein said second memory comprises:

an external program memory.

10. The method according to claim 1, wherein said second memory comprises:

an internal program memory.

11. An arrangement for reprogramming a memory of a microcontroller, comprising:

a first memory, said first memory for storing program instructions to be executed by the microcontroller, wherein said first memory is assigned to a first logical location;

a second memory, said second memory for storing data information, wherein said second memory is assigned to a second logical location;

a pre-determined bit, said pre-determined bit for controlling assignment of said first and second logical locations to said first and second memories; and a logical value associated with said pre-determined bit, said logical value determining logical location of said first memory, wherein changing of said logical value interchanges said first logical location of said first memory with said second logical location of said second memory.

12. The arrangement according to claim 11, wherein complementing said pre-determined bit resets the system.

13. The arrangement according to claim 11, wherein, responsive to interchanging said first logical location of said first memory with said second logical location of said second memory, said second memory stores program instructions to be executed by the microcontroller.

14. The arrangement according to claim 11, wherein said reprogramming comprises:

in-system programming.

15. The arrangement according to claim 11, wherein said first memory comprises:

a lowest 1K of internal program memory space.

16. The arrangement according to claim 11, wherein said pre-determined bit is located within a register.

17. The arrangement according to claim 11, wherein said pre-determined bit is battery backed.

18. The arrangement according to claim 11, wherein said first memory stores reset and interrupt vectors.

19. The arrangement according to claim 11, wherein said pre-determined bit requires Timed Access Operation.

20. A method for providing protected reprogramming of a memory in an electronic device, the method comprising the steps of:

providing a first memory, said first memory storing program instructions that the microcontroller is capable of executing;

providing a second memory, said second memory storing information;

identifying a pre-determined bit in a register, said pre-determined bit determining storage to said first memory and said second memory;

altering said information of said second memory to produce altered information;

changing a logical value of said pre-determined bit in said register; and responsive to said step of changing, storing said altered information of said second memory in said first memory, thereby allowing for the protected reprogramming of said first memory.

21. An electronic device for providing a safeguard against unexpected loss of data during memory reprogramming, the electronic device comprising:

a first memory, said first memory for storing program instructions, wherein said first memory is assigned to a first logical location;

a second memory, said second memory for storing data information, wherein said second memory is assigned to a second logical location;

a pre-determined bit, said pre-determined bit for controlling assignment of said first and second logical locations to said first and second memories; and a logical value associated with said pre-determined bit, wherein changing said logical value interchanges said first logical location of said first memory with said second logical location of said second memory.

22. A microcontroller for providing protected reprogramming of a memory, the microcontroller comprising:

a first memory, said first memory for storing program instructions, wherein said first memory is assigned to a first logical location;

a second memory, said second memory for storing data information, wherein said second memory is assigned to a second logical location;

a register, said register for storing memory bits associated with said first and second memories;

a memory select bit, said memory select bit stored in said register and having a logical value, said memory select bit further controlling assignment of said first and second logical locations to said first and second memories; and wherein, changing said logical value associated with said memory select bit interchanges said first logical location of said first memory with said second logical location of said second memory.

23. An electronic device for reprogramming a memory, comprising:

means for providing a first memory and a second memory, said first memory storing program instructions, said second memory storing information;

means for identifying a pre-determined bit in a register, wherein a logical value of said pre-determined bit determines a first logical location of said first memory and a second logical location of said second memory;

means for altering said information of said second memory to produce altered information;

means for changing said logical value of said pre-determined bit in said register; and means for interchanging said first logical location of said first memory with said second logical location of said second memory.

24. An arrangement for altering a memory-addressing scheme of a memory, the arrangement comprising:

a first memory having a first memory location with address X;

a second memory having a second memory location with address Y; and a pre-determined bit associated with said first memory and said second memory, said pre-determined bit having a logical value, wherein said logical value, when changed, assigns said first memory to said second memory location with address Y and said second memory to said first memory location with address X.

25. A method for manipulating the logical address locations of two memories in an electronic device, the method comprising the steps of:

assigning a first memory to a first set of logical address locations ranging from W to X;

assigning a second memory to a second set of logical address locations ranging from Y to Z;

designating a memory indicator to determine allocation of said first set of logical address locations and said second set of logical address locations to said first and second memories; and adjusting said memory indicator such that said first set of logical address locations ranging from W to X are assigned to said second memory and said second set of logical address locations ranging from Y to Z are assigned to said first memory.

26. The method according to claim 25, wherein said first set of logical address locations ranging from W to X correspond to logical address locations ranging from O to M and said second set of logical address locations ranging from Y to Z correspond to logical address locations (M+1) to 2M.

27. The method according to claim 26, wherein said step of adjusting said memory indicator such that said first set of logical address locations ranging from W to X are assigned to said second memory and said second set of logical address locations ranging from Y to Z are assigned to said first memory further comprises the steps of:
- adding M to any incoming address ranging from O to M; and
- subtracting M from any incoming address ranging from (M+1) to 2M.

28. The method according to claim 25, wherein said step of adjusting said memory indicator such that said first set of logical address locations ranging from W to X are assigned to said second memory and said second set of logical address locations ranging from Y to Z are assigned to said first memory further comprises the steps of:
- re-routing incoming memory access requests corresponding to said first set of logical address locations ranging from W to X to said second memory; and
- re-routing incoming memory access requests corresponding to said second set of logical address locations ranging from Y to Z to said first memory.

* * * * *